United States Patent [19]

Careglio et al.

[11] 4,130,860
[45] Dec. 19, 1978

[54] FLUORESCENT LAMP SUPPORT ASSEMBLAGE WITH BUILT-IN CONVERTER FOR THE LIGHTING OF VEHICLES

[75] Inventors: Giuseppe Careglio; Giovanni Proietti, both of Turin, Italy

[73] Assignee: WABCO Westinghouse, Turin, Italy

[21] Appl. No.: 787,733

[22] Filed: Apr. 14, 1977

[30] Foreign Application Priority Data

May 4, 1976 [IT] Italy .............................. 68086 A/76

[51] Int. Cl.² .......................... F21S 3/00; H01R 33/08
[52] U.S. Cl. .................................... 362/217; 362/221; 339/50 R
[58] Field of Search ................. 362/217, 221, 225, 76; 339/50 R, 53, 56

[56] References Cited

U.S. PATENT DOCUMENTS

| 2,765,397 | 10/1956 | Harris | 362/217 |
| 3,176,260 | 3/1965 | Pascucci | 362/217 |
| 3,191,019 | 6/1965 | Rijnders | 362/225 |
| 3,604,920 | 9/1971 | Niles | 362/221 |
| 3,953,768 | 4/1976 | Meredith | 362/221 |
| 4,025,780 | 5/1977 | Krase | 362/221 |

*Primary Examiner*—Verlin R. Pendegrass
*Assistant Examiner*—Donald P. Walsh
*Attorney, Agent, or Firm*—R. W. McIntire, Jr.

[57] ABSTRACT

A fluorescent lamp support assemblage comprising a printed circuit board on which is pre-mounted the electrical components comprising a converter or the like for supplying proper power to operate the vehicle lights and a sheet metal member cut and bent into a channel-shaped form. The printed board and a pair of fluorescent lamp holders are secured in place on the respective side walls and base of the channel-shaped member by snap inserting a plurality of tabs on the printed circuit board panel into conforming slots in the side walls in the case of the circuit board and by snap inserting the opposite edges of an opening in the base of the channel-shaped member into a notch formed in each side of the lamp holders in the latter case.

4 Claims, 4 Drawing Figures

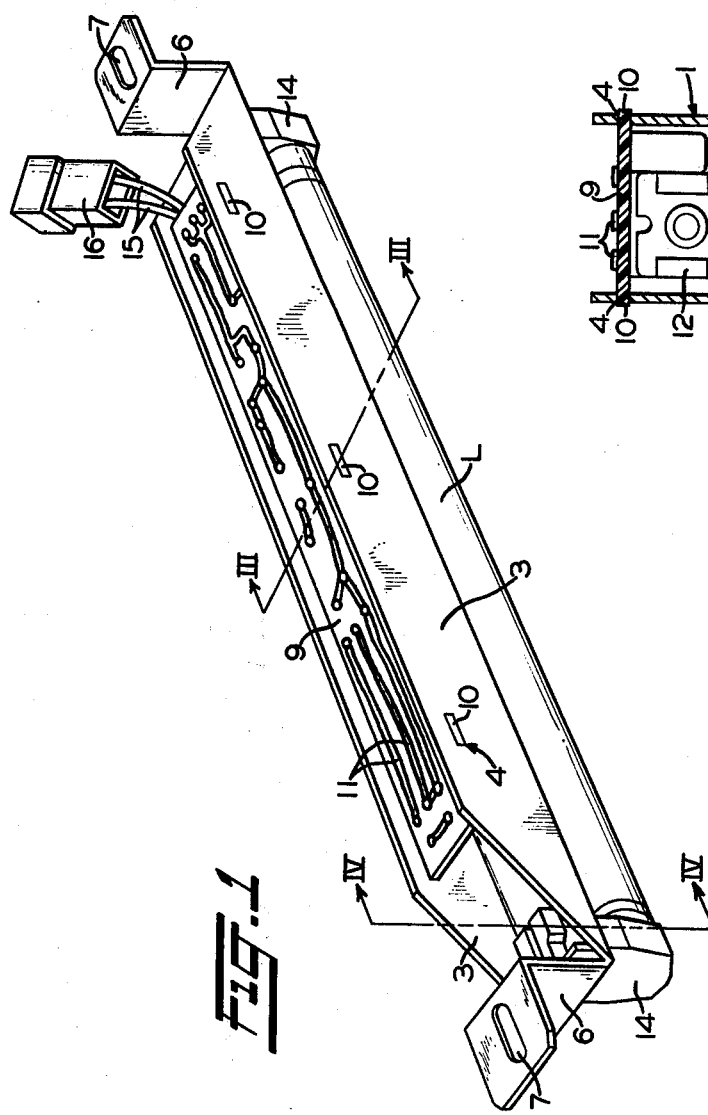
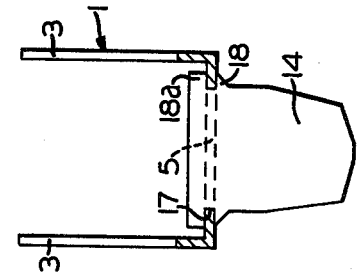
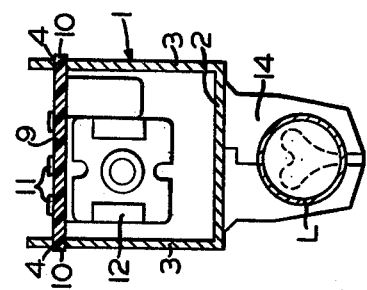

FLUORESCENT LAMP SUPPORT ASSEMBLAGE WITH BUILT-IN CONVERTER FOR THE LIGHTING OF VEHICLES

BACKGROUND OF THE INVENTION

The present invention relates to a support assemblage for fluorescent lamps, particularly fluorescent lamps requiring a converter, as for lighting a rail vehicle for example.

Known support assemblages of this type consist of several supporting structures joined together by means of screws and rivets, which require considerable expenditure in the manufacture and assembly of these supporting structures.

SUMMARY OF THE INVENTION

The object of the present invention, therefore, is to provide an improved fluorescent lamp support asemblage by virtue of a structure that simplifies assembly of the members comprising the support assemblage.

In attaining this objective, there is provided by the present arrangement for a support structure with a built-in converter for fluorescent lamps a channel-shaped sheet metal part having integral end brackets by which means the channel-shaped part may be fastened to a supporting framework and an insulating plate on which the electrical components comprising the converter are mounted. The converter electrical components are interconnected by means of printed circuits on the insulating plate to which are also connected by flexible conductors the fluorescent lamp holders and the connector plug for connection with the power source. The assemblage is characterized by the fact that the insulating plate and the fluorescent lamp holders are mounted to the respective side and bottom plates of the channel-shaped member by snap insertion means.

Preferrably, these snap insertion means for mounting the insulating plate are provided by tabs formed on the insulating plate so as to snap fit into corresponding slots in the side walls of the channel-shaped member, while the snap insertion means for mounting the lamp holders are provided by an undercut notch in the holder into which the perimeter of the opening formed in the bottom of the channel-shaped member snaps.

BRIEF DESCRIPTION OF THE DRAWINGS

The object and advantages of the invention will become apparent from the description which follows with reference to the accompanying drawings in which:

FIG. 1 is an isometric view of a fluorescent lamp support assembly according to the invention;

FIGS. 3 and 4 are sectional views taken along the respective lines III—III and IV—IV of FIG. 1.

Figure 2:
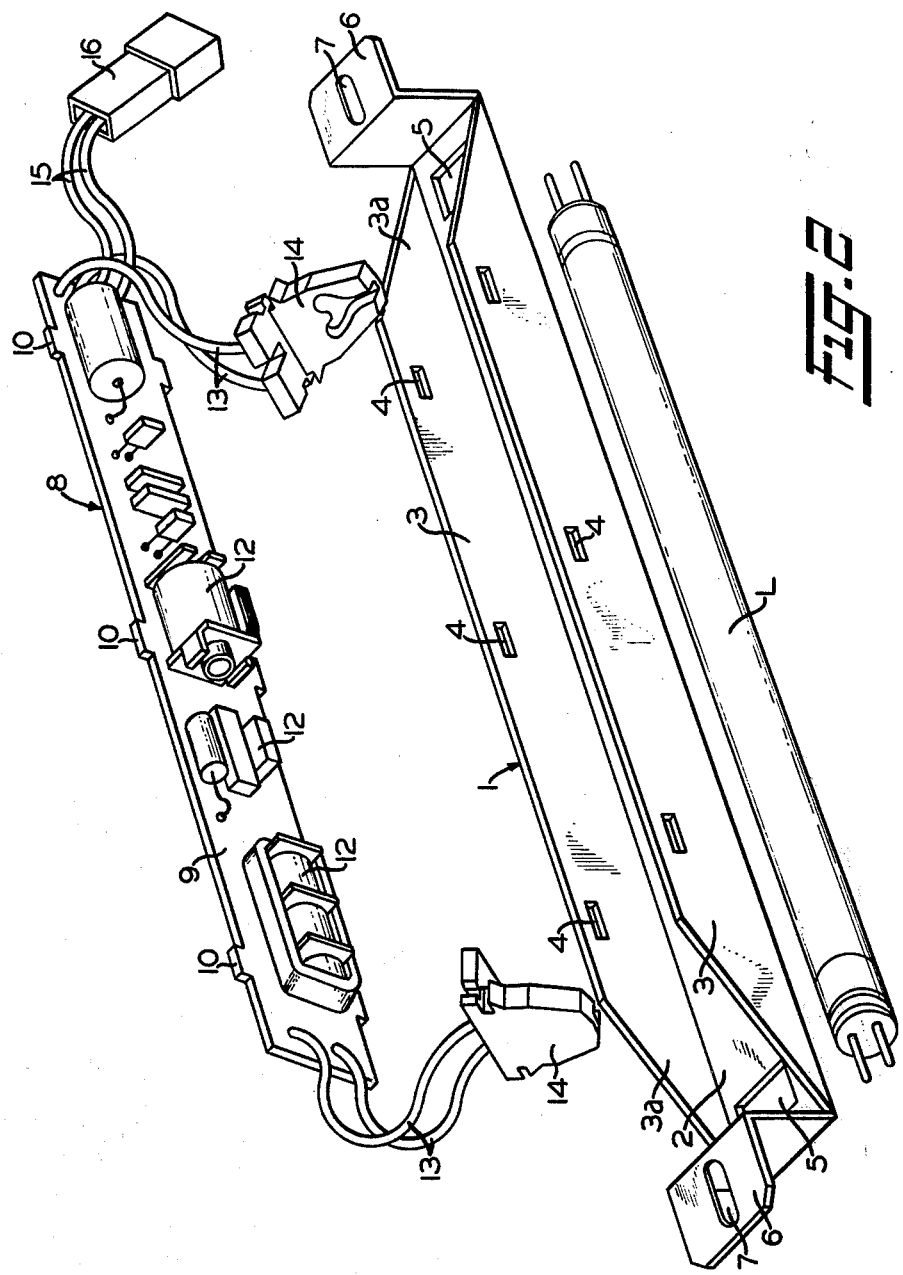
FIG. 2 is an exploded view of the support assembly shown in FIG. 1.

Comprising a fluorescent lamp assemblage is a channel-shaped member 1 that includes a base 2 and two spaced-apart side walls 3, whose respective ends terminate in an angular section 3a. The channel-shaped member is formed from a singular piece of sheet metal, such as galvanized sheet iron, which is cut and bent into the described shape. Each side wall 3 is formed in the vicinity of its free edge with a plurality of slots 4, while the base 2 is provided at each end with a rectangular aperture 5. Also extending from each end of base 2 is an L-shaped end bracket 6 having an elongated slot 7 for receiving a fastener, such as a bolt, screw or the like to secure the channel-shaped member 1 to a supporting framework.

A printed circuit board 8 comprising a panel 9 of an electrical insulating material is formed with a plurality of tabs 10 that project outwardly from two opposite edges of panel 7. These tabs 10 correspond in number, size and spacing to the slots 4 in side walls 3 of member 1 to permit snap insertion of the tabs in the slots in order to secure panel 9 in place. The outer face of panel 9 contains the flow soldering 11 forming the printed circuitry which electrically connects components 12 mounted on the inner face of panel 9. Components 12 comprise the electrical elements forming a converter suitable for conditioning the vehicle power supply in accordance with the fluorescent lamp requirements. Also connected electrically to the printed circuit on panel 9 by flexible conductors 13 are a pair of fluorescent lamp holders 14. Flexible conductors 15 similarly connect a plug connector 16 to the printed circuitry, thereby connecting the vehicle power supply to components 12.

Each lamp holder 14 is inserted in aperture 5 so as to receive a fluorescent lamp L. Lamp holders 14 are conventional except for a notch 17 on each side of these lamp holders formed by an inclined lug 18 terminating short of a shoulder 18a on which the lamp holder seats about aperture 5. The space between inclined surface 18 and shoulder 18a provides notch 17 into which the edges of aperture 5 in base 2 snaps as the lamp holder 14 is pressed into position, as best shown in FIG. 4. In this manner, the respective lamp holders are easily locked into their proper position, as is printed circuit board 8 without the need for screws, rivets or other conventional fasteners.

In that this assemblage consists of essentially two main support structures, namely circuit board 8 on which components 12 are pre-mounted and channel-shaped member 1 on which circuit board 8 and lamp holders 14 are mounted, the simplicity of the lamp assemblage according to the present invention will be appreciated.

Having now described the invention, what we claim as new and desire to secure by Letters Patent, is:

1. A fluorescent lamp support assemblage including a built-in converter for rendering a vehicle power supply suitable for lighting of fluorescent lamps, wherein the support assemblage comprises:
   (a) a channel-shaped member formed of sheet metal and having integral end brackets adapted to receive a fastener to secure said channel-shaped member to a supporting framework of the vehicle;
   (b) a printed circuit board on which is pre-mounted the electrical components forming the converter, said circuit board being fastened to the side walls of said channel-shaped member;
   (c) a pair of fluorescent lamp holders electrically connected to said printed circuit board by flexible conductors, said lamp holders being fastened to the base of said channel-shaped member at opposite ends thereof for receiving a fluorescent lamp;
   (d) snap insertion means for providing said fastening of said printed circuit board and said lamp holders to said channel-shaped member comprising:
      (i) a plurality of tabs along two opposite edges of said printed circuit board and extending laterally therefrom; and
      (ii) a plurality of slots in the side walls of said channel-shaped member corresponding in number, size and spacing to said tabs so as to receive said tabs in locking engagement therewith.

(e) a plug connector to which the vehicle power supply is connected, said plug connector being connected to said printed circuit board by flexible conductors.

2. The fluorescent lamp support assemblage as recited in claim 1, said printed circuit board comprising a panel of electrical insulating material on which said components forming the converter are mounted, said components being connected in circuit by means of flow soldering on said circuit board panel.

3. A fluorescent lamp support assemblage including a built-in converter for rendering a vehicle power supply suitable for lighting of fluorescent lamps, wherein the support asemblage comprises:

(a) a channel-shaped member formed of sheet metal and having integral end brackets adapted to receive a fastener to secure said channel-shaped member to a supporting framework of the vehicle;

(b) a printed circuit board on which is pre-mounted the electrical components forming the converter, said circuit board being fastened to the side walls of said channel-shaped member;

(c) a pair of fluorescent lamp holders electrically connected to said printed circuit board by flexible conductors, said lamp holders being fastened to the base of said channel-shaped member at opposite ends thereof for receiving a fluorescent lamp;

(d) snap insertion means for providing said fastening of said printed circuit board and said lamp holders to said channel-shaped member comprising:

(i) an aperture formed in opposite ends of the base of said channel-shaped member in which said lamp holders are inserted;

(ii) each said lamp holder having a stop shoulder engageable with the base of said channel-shaped member to seat said holder in its proper position when inserted in the aperture of said channel-shaped member and an inclined lug extending outwardly from two opposite sides of the lamp holder, said inclined lug and said stop shoulder cooperating to form a notch therebetween into which the edges formed by said aperture snap when said lamp holder is inserted therein so as to lock said lamp holder in said proper position.

(e) a plug connector to which the vehicle power supply is connected, said plug connector being connected to said printed circuit board by flexible conductors.

4. The fluorescent lamp support assemblage as recited in claim 3, said printed circuit board comprising a panel of electrical insulating material on which said components forming the converter are mounted, said components being connected in circuit by means of flow soldering on said circuit board panel.

* * * * *